June 17, 1969

C. W. SPANGLER 3,450,888

SPEED CONTROL OF MOVING PAPER RESPONSIVE
TO TRANSMITTANCE OF PAPER

Filed Oct. 11, 1966

INVENTOR.
CHARLES W. SPANGLER
BY
HIS ATTORNEY

United States Patent Office 3,450,888
Patented June 17, 1969

3,450,888
SPEED CONTROL OF MOVING PAPER RESPONSIVE TO TRANSMITTANCE OF PAPER
Charles W. Spangler, Waynesboro, Va., assignor to General Electric Company, a corporation of New York
Filed Oct. 11, 1966, Ser. No. 585,827
Int. Cl. H01j *39/12*
U.S. Cl. 250—219                                5 Claims

ABSTRACT OF THE DISCLOSURE

The invention concerns the generation of a speed reference voltage for controlling the speed and therefore the exposure time of a copying machine as a direct function of the transmittancy of the negative paper. The same light source is employed to examine the paper to establish the speed reference voltage and to expose the paper, thereby eliminating the condition of the light source as a factor in determining speed of operation. A photocell reads the transmittancy and produces a voltage which is stored and directly applied to the speed control circuit to reference the drive speed of the copier.

---

Figure 1:
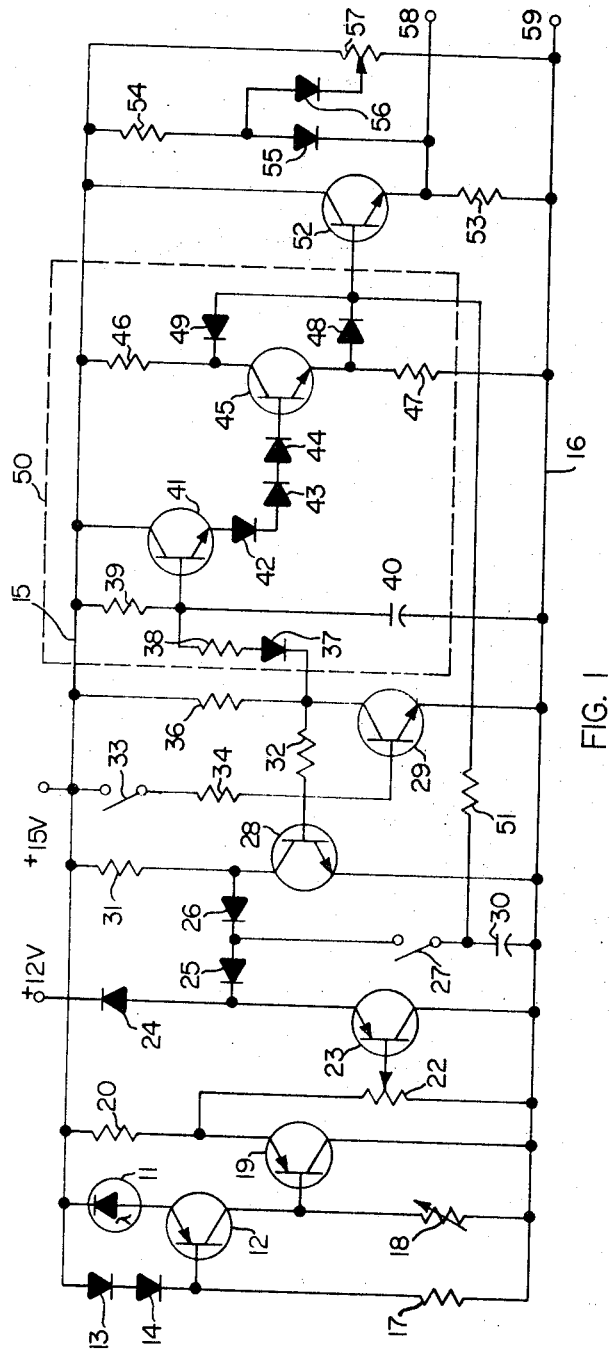

This invention relates to a speed reference voltage generator and more specifically to a circuit for generating the speed reference voltage for a copying machine as a function of negative paper transmittancy.

In the whiteprint industry it has long been the practice to set the speed of the drive motor in a copying machine manually. The practice is for the operator to examine the original or negative paper to estimate its transmittancy and adjust the speed setting of the machine accordingly. This process is time-consuming and is only as accurate as the experience of the operator permits.

It is therefore an object of the present invention to automatically control the speed of a copying machine as a function of negative paper transmittancy.

Devices to automatically control the speed of the copying machine are not unknown. These devices have, however, proved to be slow, bulky and expensive. One such prior art device incorporates a motor-operated potentiometer for automatically selecting a portion of a reference voltage where the portion determines drive motor speed and is a function of negative paper transmittancy. Such a device eliminates the need to rely on the experience of the operator but its size, cost and speed of response have proved to be commercial disadvantages.

The present invention incorporates the advantages of automatic speed control and overcomes the disadvantages of prior art devices by directly generating the speed reference voltage for the copying machine drive motor as a function of negative paper transmittancy.

It is accordingly another object of the present invention to generate a speed reference voltage to automatically control the drive speed of a copying machine as a function of negative paper transmittancy.

In general, the invention comprises a photosensitive device positioned in the feed path of the negative paper to receive light passing through the paper to provide an indication of the transmittancy of the paper. The device current is converted by an amplifier to a voltage that is thus proportional to light intensity. This voltage is stored for a period of time sufficient to allow the negative paper to pass through the copying machine and is applied to the drive motor speed control circuit as the speed reference voltage.

Figure 2:
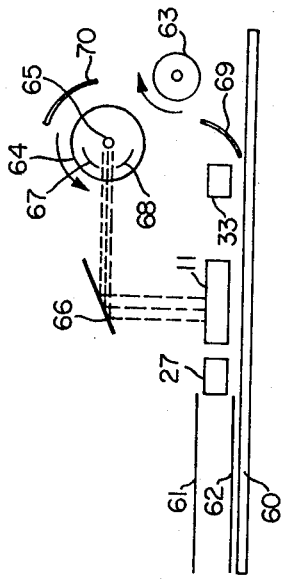

The invention with its advantages and other objects may be better understood from the following detailed description of the embodiment shown by way of example in the drawings, in which:

FIGURE 1 is a schematic diagram of a speed reference voltage generating circuit and FIGURE 2 is an illustration of a portion of a copying machine.

In the drawings like reference numerals refer to like parts throughout. First, referring to FIGURE 2, there is shown negative paper 61 and print paper 62 being driven by means not shown through a copying machine a portion of which is indicated at 60. The print paper passes behind a switch 27, the photosensitive device 11 and a switch 33 while the negative paper first passes over switch 27 then over the photosensitive device 11 to interrupt the light from the source 65. The light emanates from source 65, passes between shields 67 and 68 and is deflected by mirror 66 onto the photosensitive device 11. The negative paper then passes over switch 33 whereupon, as will be discussed later, the speed reference voltage generating circuit is activated to produce a voltage proportional to the light that passes through negative paper 61 to be received by the photosensitive device. As the leading edge of negative paper 61 and print paper 62 pass switch 33, the print paper is deflected upward by the deflector 69 so that both papers are driven by roller 63 between the transparent drum 64 and deflector 70. Here the papers are exposed to light source 65 contained within the drum and printing takes place. Light source 65 thus serves both to expose tthe print paper and to supply the light necessary for the photosensitive device to obtain a reading of the negative paper transmittancy. Utilizing the same light source for both functions enables the process to be free from the effects of light source deterioration. A weak light source permits less light to pass through the negative and is accordingly converted to a low speed command as is desired for a weak source of light.

It is to be noted that FIGURE 2 does not illustrate any one particular copying machine. In fact, the parts shown may not be found in exact duplication in any copying machine. The purpose of the figure is only to illustrate the concept of using the same light source to obtain a print and to provide an indication of negative density. This figure also illustrates the relative positions of the switches with respect to the photosensitive device 11.

Referring now to FIGURE 1, a photovoltaic cell 11 is shown coupled to a capacitor 30 through a switch 27 and an amplifier including transistors 12, 19 and 23. The photovoltaic cell 11 is shown in the emitter circuit of transistor 12 which is operating in a common base configuration. Diodes 13 and 14 couple the base to positive bus 15 to provide a fixed bias supply for the transistor and also serve to reverse bias the cell 11. Resistor 17 coupled to the base of transistor 12 and to common bus 16 provides a path for current to flow through diodes 13 and 14. The reverse bias across the photovoltaic cell 11 is necessary to obtain the desired linear current with light characteristic from this device.

The collector of transistor 12 is coupled to the common bus 16 by variable resistor 18. By adjusting the value of resistor 18, the voltage gain of this stage of the amplifier is varied. Resistor 18 receives the cell current and develops a voltage that is thus directly proportional to light intensity. An emitter-follower transistor 19 has its base directly coupled to the collector of transistor 12 to provide current gain and prevent loading of the voltage appearing across resistor 18. The emitter-follower includes PNP transistor 19 and emitter resistor 20 which couples the emitter to the positive supply 15. The collector of the transistor is directly connected to the common bus 16. Transistor 23 which is coupled to the emitter of transistor 19 by potentiometer 22 completes the amplifier. This transistor provides additional current gain and together with potentiometer 22 provides a means for selecting portions of the voltage appearing across resistor 18 to match various paper speeds and to provide a gain adjustment to adapt for the variation in different copying machines.

A diode 24 oriented to conduct whenever the voltage at its anode exceeds the 12 volt supply at its cathode, thereby clamping the emitter of transistor 23 to the positive 12 volt supply to provide a maximum voltage limit of this value. The 12 volts represent the maximum safe speed at which the drive motor of the copying machine can be run. The output of transistor 23 is coupled to the capacitor 30 by a diode 25 and switch 27. If diode 25 were connected with its cathode to capacitor 30 instead of its anode as shown, the voltage at the emitter of transistor 23 would be applied to capacitor 30 to charge this device upon the closing of switch 27. However, diode 25 serves merely to clamp the capacitor to the maximum voltage appearing on the emitter of transistor 23. Capacitor 30 is thus charged from the source voltage at bus 15 through resistor 31 and diode 26. Charging the capacitor from the voltage supply instead of from the voltage at the amplifier output prevents the capacitor from loading down the amplifier and provides a stiff source of voltage to rapidly charge capacitor 30 so that the voltage stored by this device very quickly assumes the level of the voltage indicative of light intensity. Little time is thus consumed in charging the capacitor and the voltage across this device immediately appears at the output terminals 58, 59 of the circuit.

Transistor 28 is coupled across switch 27 and capacitor 30. But for this transistor the capacitor would charge as the negative paper passed over switch 27 to close this device. If the capacitor charged at this time, the negative would not yet have intercepted the light received by the photovoltaic cell and the voltage to which capacitor 30 would charge would not be an indication of the transmittancy of that paper but of the intensity of the light source itself. Since it is not desired to charge the capacitor until the paper is over cell 11, there is provided a second switch 33 located beyond the cell as indicated in FIGURE 2, the closing of which permits the charging of capacitor 30.

Transistor 28 coupled across the switch 27 and capacitor 30 is normally conducting with its collector connected to the voltage source at 15 through resistor 31 and its base connected to this positive potential through resistors 32 and 36. During conduction, the voltage at the collector of transistor 28 is substantially at the common bus level and current will not flow through the diode 26 which couples the transistor collector to switch 27. Upon the closing of switch 33, resistor 34 couples the base of transistor 29 to the positive supply causing this device to conduct whereby its collector is substantially at the common bus level and transistor 28 no longer has a positive voltage at its base. Transistor 28 is thus turned off when switch 33 is closed and current can flow through resistor 31 and diode 26 to charge capacitor 30. As described previously, the capacitor will charge to the voltage on the emitter of transistor 23 due to the clamping action of diode 25. The voltage across the capacitor immediately appears across resistor 53 via the coupling of resistor 51 and transistor 52. Transistor 52 with resistor 53 forms an emitter follower providing high current gain to obtain a long time constant for the discharge of capacitor 30. A long time constant is necessary for the discharge of this storage device since the reading of light intensity which serves as the speed reference voltage for the drive motor must be preserved for the time that it takes the machine to complete the copying process.

To insure that the copying machine motor is not run too slow, the circuit of FIGURE 1 also shows means for supplying a minimum speed voltage including resistor 54, potentiometer 57 and diodes 55 and 56. Potentiometer 57 is coupled between the positive bus 15 and common bus 16 so that the portion of the voltage developed thereacross which appears at the wiper is the minimum speed voltage. Resistor 54, diode 56, and the bottom portion of potentiometer 57 forms another current path between positive bus 15 and common bus 16. This connection insures the conduction of diode 56 so that the voltage at the wiper arm of the potentiometer plus the voltage rise across diode 56 appears at the anode of diode 55, which has its anode coupled to resistor 54 and its cathode to the emitter of transistor 52. Diode 55 thus is forward biased into conduction whenever the voltage at the emitter of transistor 52 falls below the voltage at the anode of diode 55 by at least a diode voltage drop. The low resistance of resistor 54 and potentiometer 57 compared with that of resistor 53 and the load which is coupled across the output terminals of the circuit insures that the voltage set at the wiper of potentiometer 57 will be the controlling voltage applied at the output terminals.

The remainder of the speed reference voltage generator circuit shown in FIGURE 1 is included within dashed block 50. This portion of the circuit consists of a timer and an idle speed voltage generator. When switch 33 is closed, the timer is reset by the discharge of capacitor 40 through resistor 38, diode 37 and the conducting transistor 29. As the negative 61 moves past the switch 33 so that this switch opens, diode 37 is immediately back-biased with the opening of transistor 29 eliminating the discharge path for capacitor 40 so that charging can begin via resistor 39 coupled to the positive bus 15. As capacitor 40 charges sufficiently to overcome the base-emitter diode voltage drop of transistor 41 and the diode voltage drops of diodes 42, 43 and 44 connected to the emitter of transistor 41 and also the voltage drop of the base-emitter diode of transistor 45, transistors 41 and subsequently 45 will be turned on. Diodes 42, 43 and 44 appear in the timing circuit coupled between the emitter of transistor 41 and the base of transistor 45 for the very purpose of providing a threshold for turning on transistor 45. Transistor 41 merely provides gain sufficient to provide a long time constant for the charging of capacitor 40. As transistor 45 begins to conduct, the voltage at the emitter and thus across resistor 47 coupled between the emitter and the common bus 16 begins to rise. Likewise, the voltage across resistor 46 coupled between the collector of transistor 45 and the positive bus 15 begins to rise as the voltage at the collector falls. When transistor 45 saturates the ratio between resistors 46 and 47 determines the standby or idle speed voltage.

If the voltage on capacitor 30 and thus at the base of transistor 52 exceeds the voltage at the collector of transistor 45, diode 49 coupled between the base of transistor 52 and the collector of transistor 45 is forward biased and conducts to clamp the voltage at the base of transistor 52 to the voltage at the collector of transistor 45. If the voltage at the base of transistor 52 is lower than the voltage at the emitter of transistor 45, diode 48 coupled between these points will be forward biased and the voltage at the base of transistor 52 will be raised to the voltage appearing across resistor 47. Thus whether the voltage at the base of transistor 52 is lower or higher than the idle speed voltage determined by resistors 46 and 47, diodes 48 and 49 will clamp the voltage on the base of transistor 52 and thus the circuit output voltage to the idle speed voltage after a period of time determined by the charging of capacitor 40.

It is to be understood that the time required for the charging of capacitor 40 and the turning on of transistor 45 is sufficient to insure that the negative, which by passing beyond switch 33 has initiated the timing circuit, has had time to pass through the machine to complete the copying process before the drive motor is returned to idle speed.

While a particular embodiment of the invention is shown in FIGURE 1 there are many variations of this circuit that may be made without varying from the concept of the invention. For example, diodes 13 and 14 as well as diodes 42, 43 and 44 could be replaced by batteries of appropriate sizes. Switches 27 and 33 could be of any type. Photo switches, for example, may be used in place of the knife switches shown.

Capacitor 30 has been described as being charged directly from the power supply. The advantages of this connection have been enumerated. It should be understood, however, that by increasing the gain of the amplifier coupled to the photocell and with minor circuit changes such as the reversal of diode 25, the amplifier could charge capacitor 30 directly.

It should also be understood that many other photosensitive devices could be used in place of the photovoltaic cell 11. Phototubes, phototransistors and photoresistive elements with the appropriate circuitry could readily be substituted.

The advantages of the invention are not only to be realized in whiteprint machines but are readily applicable in any area of paper copying where the exposure of the print is a function of the speed at which the paper travels through the machine. Photocopiers, and photographic print makers are other copying machines where the advantages of a speed reference voltage generator to measure the transmittancy of the negative and control the speed of the drive motor according to the measurement obtained by directly supplying the speed reference voltage to the motor may be enjoyed.

What is claimed and desired to be secured by Letters Patent of the United States is:

1. In a copying machine having a light source and a drive motor for driving negative and print paper along a path exposed to said light source, wherein said drive motor has a speed control circuit in which the magnitude of a reference voltage controls the motor speed, a circuit for generating the speed reference voltage as a function of negative paper transmittancy comprising:
   photosensitive means receiving light from said light source passing through said negative paper and developing a voltage proportional to light intensity;
   capacitive storage means coupled to said photosensitive means to assume and preserve for a predetermined period a voltage equal to the voltage developed by said photosensitive means; and,
   means supplying the voltage stored by said storage means to said speed control circuit as said speed reference.

2. In a copying machine having a light source and a drive motor for driving negative and print paper along a path exposed to said light source, wherein said drive motor has a speed control circuit in which the magnitude of a reference voltage controls the motor speed, a circuit for generating the speed reference voltage as a function of negative paper transmittancy comprising a photosensitive device positioned to receive light from said light source passing through said negative paper, an amplifier having a low input impedance, said amplifier being coupled to said device for converting device current to a voltage proportional to light intensity, storage means coupled to said amplifier to assume and preserve a voltage equal to the voltage at the output of said amplifier for a predetermined period, and means supplying the voltage stored by said storage means to said speed control circuit as said speed reference.

3. In a copying machine having a light source and a drive motor for driving negative and print paper along a path exposed to said light source, wherein said drive motor has a speed control circuit in which the magnitude of a reference voltage controls the motor speed, a circuit for generating the speed reference voltage as a function of negative paper transmittancy comprising a photosensitive device positioned to receive light from said light source passing through said negative paper, an amplifier having a low input impedance, said amplifier being coupled to said device for converting device current to a voltage proportional to light intensity, a capacitor, switch means, said switch means being closed by the presence of said negative paper over said photosensitive device, said capacitor being coupled to said amplifier by said switch means when closed to assume and preserve a voltage equal to the voltage at the output of said amplifier for a predetermined period, and coupling means supplying the voltage stored by said capacitor to said speed control circuit as said speed reference voltage.

4. In a copying machine, a circuit for generating the speed reference voltage as recited in claim 3, wherein said switch means includes first and second switches coupled to said capacitor and positioned respectively before and after said photosensitive device in the path of travel of said negative paper so that the switch means is closed when said negative paper is over and thereby has closed said second switch and said switch means is opened when said negative paper has passed and thereby opened said first switch.

5. In a copying machine, a circuit for generating the speed reference voltage as recited in claim 4, further including an idle speed voltage limiting means including a timing circuit, said idle speed voltage limiting means being coupled to said coupling means to limit the voltage supplied to said speed control circuit to the idle speed voltage, the limiting action of said idle speed voltage limiting means commencing after the opening of said second switch at a time determined by said timing circuit.

References Cited
UNITED STATES PATENTS 3,254,241   5/1966   Rogers et al. _____ 307—237

RALPH G. NILSON, *Primary Examiner.*

M. ABRAMSON, *Assistant Examiner.*

U.S. Cl. X.R.
250—214; 307—235, 237